US010697545B2

(12) United States Patent
Maggi et al.

(10) Patent No.: US 10,697,545 B2
(45) Date of Patent: Jun. 30, 2020

(54) PACKING CUPS MANUFACTURING (71) Applicant: Nuovo Pignone Srl, Florence (IT)

(72) Inventors: Carmelo Maggi, Florence (IT); Tognarelli Leonardo, Florence (IT); Alessio Capanni, Florence (IT); Jan Wojnar, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 467 days.

(21) Appl. No.: 14/758,067

(22) PCT Filed: Dec. 20, 2013

(86) PCT No.: PCT/EP2013/077827
§ 371 (c)(1),
(2) Date: Jun. 26, 2015

(87) PCT Pub. No.: WO2014/102217
PCT Pub. Date: Jul. 3, 2014

(65) Prior Publication Data
US 2015/0330511 A1 Nov. 19, 2015

(30) Foreign Application Priority Data
Dec. 27, 2012 (EP) .................... 12461569

(51) Int. Cl.
*B23P 11/02* (2006.01)
*F16J 15/26* (2006.01)
(Continued)

(52) U.S. Cl.
CPC ............. *F16J 15/26* (2013.01); *B23P 11/022* (2013.01); *B23P 11/025* (2013.01);
(Continued)

(58) Field of Classification Search
CPC . F16J 15/26; F16J 15/28; F16J 15/162; B23P 11/025; B23P 11/022; Y10T 29/49876; Y10T 29/49867
See application file for complete search history.

(56) References Cited

U.S. PATENT DOCUMENTS 4,163,561 A * 8/1979 Butler ...................... B01J 3/002
137/318
4,809,993 A 3/1989 Henshaw
(Continued)

FOREIGN PATENT DOCUMENTS

CN 2512952 Y 9/2002
CN 1948806 A 4/2007
(Continued)

OTHER PUBLICATIONS

Joseph Perry et al., Elasto-Pastic Stresses in Thick Walled Cylinders, Journal of Pressure Vessel Technology, ASME, vol. 125, Aug. 2003, pp. 248-252.*
(Continued)

Primary Examiner — Sarang Afzali
Assistant Examiner — Ruth G Hidalgo-Hernandez
(74) Attorney, Agent, or Firm — Baker Hughes Patent Organization (57) ABSTRACT A method of manufacturing a packing cup for a hypercompressor is described. The method comprises the following steps:
providing an inner disc (25), having opposed first front face (25X) and second front face (25Y), a central axial hole (18) and at least one lubrication-oil duct (23);
autofrettaging the lubrication-oil duct (23);
after autofrettaging, removing a thickness (D) of the inner disc on both faces thereof.

10 Claims, 13 Drawing Sheets (51) Int. Cl.
*F16J 15/16* (2006.01)
*F16J 15/28* (2006.01)
(52) U.S. Cl.
CPC ............ *F16J 15/162* (2013.01); *F16J 15/28* (2013.01); *Y10T 29/49867* (2015.01); *Y10T 29/49876* (2015.01)

(56) References Cited

U.S. PATENT DOCUMENTS

| | | |
|---|---|---|
| 5,873,575 A | 2/1999 | Hanlon |
| 6,478,303 B1 | 11/2002 | Radcliffe |
| 2007/0164247 A1 | 7/2007 | Yuzawa et al. |

FOREIGN PATENT DOCUMENTS

| | | |
|---|---|---|
| CN | 201318443 Y | 9/2009 |
| CN | 102042198 A | 5/2011 |
| CN | 102076960 A | 5/2011 |
| EP | 1146263 A2 | 10/2001 |
| EP | 2302090 A1 | 3/2011 |
| EP | 2297462 B1 | 8/2012 |
| FR | 2346576 A1 | 10/1977 |
| GB | 457025 A | 11/1936 |
| GB | 928749 A | 6/1963 |
| JP | H04-126058 U | 11/1992 |
| JP | 2011-075071 A1 | 4/2011 |
| RU | 108 534 U1 | 9/2011 |

OTHER PUBLICATIONS

Giacomelli et al., "Autofretaging procedures on LDPE Hyper-Compressor Components", Proceedings of PVP 2006: Pressure Vessels and Piping Conference, Vancouver, BC, Canada, Jul. 23-27, 2006.

European Search Report and Written Opinion issued in connection with corresponding EP Application No. 12461569.1-1752 dated Jul. 23, 2013.

International Search Report and Written opinion issued in connection with corresponding PCT Application No. PCT/EP2013/077827 dated Mar. 3, 2014.

Gexia et al., "Self-reinforced ultra-high pressure vessel residual stress analysis", China Mechanical Engineering, vol. No. 22, Issue No. 05, pp. 536-540, Mar. 15, 2011.

Unofficial English translation of Office Action and Search Report issued in connection with corresponding CN Application No. 201380073943.0 dated Jul. 14, 2016.

Decision to Grant and Search Report issued in connection with corresponding RU Application No. 2015125175 dated Oct. 24, 2017.

Machine Translation and Copy of Notification of Reasons for Refusal issued in connection with corresponding JP Application No. 2015-550057 dated Oct. 31, 2017.

\* cited by examiner

PACKING CUPS MANUFACTURING

FIELD OF THE INVENTION

The subject matter disclosed herein relates to manufacturing of mechanical components subject to high pressure stresses. In particular, the present disclosure relates to manufacturing of packing cups for reciprocating compressors, especially hyper-compressors.

BRIEF DESCRIPTION

Hyper compressors, those capable of producing gas pressure levels up to or above 3,000 bars, are widely used in industrial application, including, but not limited to, the production of low density polyethylene, or LDPE. Hyper-compressors must withstand very high delivery pressures and pressure fluctuations between discharge and suction and can be considered one of the most stressed pressure vessels in the industry. Due to very high pulsating pressures and consequent fatigue stresses, hypercompressors require pre-stressing of cylinder components, to prevent crack propagation. Packing cups are among the most critical components of a hyper-compressor.

Pre-stressing is obtained by shrink-fitting and autofrettage. Shrink-fitting is a technique whereby an outer cylinder or an outer disc and an inner cylinder, or an inner disc, are assembled together with a high degree of mutual interference. The inner disc is cooled down to a very low temperature, for example around −190° C. and the outer disc is heated up to a high temperature, e.g. 370° C. The inner disc is then fitted into a hole of the outer disc. When the two discs are brought again to ambient temperature, the thermal expansion of the inner disc and the thermal retraction of the outer disc will generate a compressive stress on the inner disc. Usual packing cups are manufactured by shrink-fitting an inner disc and an outer disc together.

Autofrettage consists in plastically yielding an internal surface or an inner layer of a component, by means of a hydraulic pressure of several hundreds MPa. When the pressure is released, the yielded portion is highly compressed by the elastic recovery of the non-yielded surrounding material. This is due to the fact that the inner portion of the material has been subjected to a deformation beyond the limit of elastic yielding and therefore cannot return to its original shape and dimension. Consequently, the elastic stress applied by the surrounding material maintains the inner plastically yielded material under compressive conditions.

Autofrettage is commonly used to induce pre-compressive stresses in the lubrication oil ducts of hyper-compressor packing cups.

Autofrettage involves complex technical problems, such as the selection of suitable seals to withstand the high pressure values required, the selection of proper pressure-transmitting oil and the accuracy of pressure measurements.

Pre-stressing of components subject to high pressure and pressure fluctuations is an essential measure to prevent crack propagations. The value of the compressive pre-stress induced in the component shall be such as to prevent tensile stresses to be induced in the material during operation by the fluid contained in the component, e.g. lubrication oil. Possible cracks present in the inner surface of a component are thus maintained in a "closed" condition. Compressive stresses inside a flaw or crack do not contribute to the crack growth. However, if the pressure of the fluid inside the component is greater than the actual compressive stress (in module), pressure propagates in the flaw and can contribute to crack propagation. If the pressure fluctuates and the peak value is higher than the compressive stress, fatigue is induced in the component, which can eventually lead to crack propagation and failure of the component.

Hyper-compressor packing cups are usually manufactured by shrink-fitting an outer disc and an inner disc together and subsequently subjecting the lubrication oil ducts present in the inner disc to autofrettage to generate a compressive pre-stress in the material surrounding the lubrication oil ducts. More details on manufacturing of packing cups for hyper-compressors are disclosed e.g. in E. Giacomelli et al., "Autofrettaging procedures on LDPE Hyper-Compressor Components", Proceedings of 2006 ASME Pressure Vessels and Piping Division Conference, Jul. 23-27, 2006, Vancouver, Canada. This paper also suggests that autofrettage can be performed prior to shrink fitting the outer disc and the inner disc together, in order to reduce the required autofrettage pressure. This paper, however, suggests that reversing the shrink fitting and autofrettage steps can give rise to Bauschinger effects and lead to unpredictable pre-stress values. Due to these difficulties, currently preferred manufacturing processes provide for shrink-fitting prior to autofrettage.

The results achieved by this technique in terms of mechanical resistance to failure due to pulsating pressure are not entirely satisfactory and a there is still a need for improvement in manufacturing of packing cups.

SUMMARY OF THE INVENTION

Embodiments of the method disclosed herein provides for an additional machining step in the manufacturing of packing cups, in particular packing cups for hyper-compressors. The additional machining step is aimed at removing a most external layer on both faces of the inner disc of the packing cup after autofrettage. This results in removing the volume of the material surrounding the lubrication-oil duct(s) of the inner disc where the residual hoop stresses and/or the residual equivalent stresses induced by autofrettage are insufficient to prevent potential expansion of accidental cracks, which might be present on the inner surface of the lubrication-oil duct(s).

According to some embodiments, a method of manufacturing a packing cup for a hyper-compressor is provided, comprising the following steps:
providing an inner disc, having opposed first front face and second front face, a central axial hole, and at least one lubrication-oil duct; the axial bore and the lubrication-oil duct extending from the first front face to the second front face;
autofrettaging the lubrication-oil duct;
after autofrettaging, removing a thickness, i.e. an outer layer, of the inner disc on both the first front face and the second front face.

The method preferably includes a step of shrink-fitting the inner disc and an outer disc after autofrettaging the lubrication-oil duct and removing the thickness on both the first front face and the second front face of the inner disc.

According to a further aspect, the present subject matter disclosed herein also relates to a packing cup for hyper-compressors and to a hyper-compressor comprising one or more packing cups, manufactured according to the above-disclosed method.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
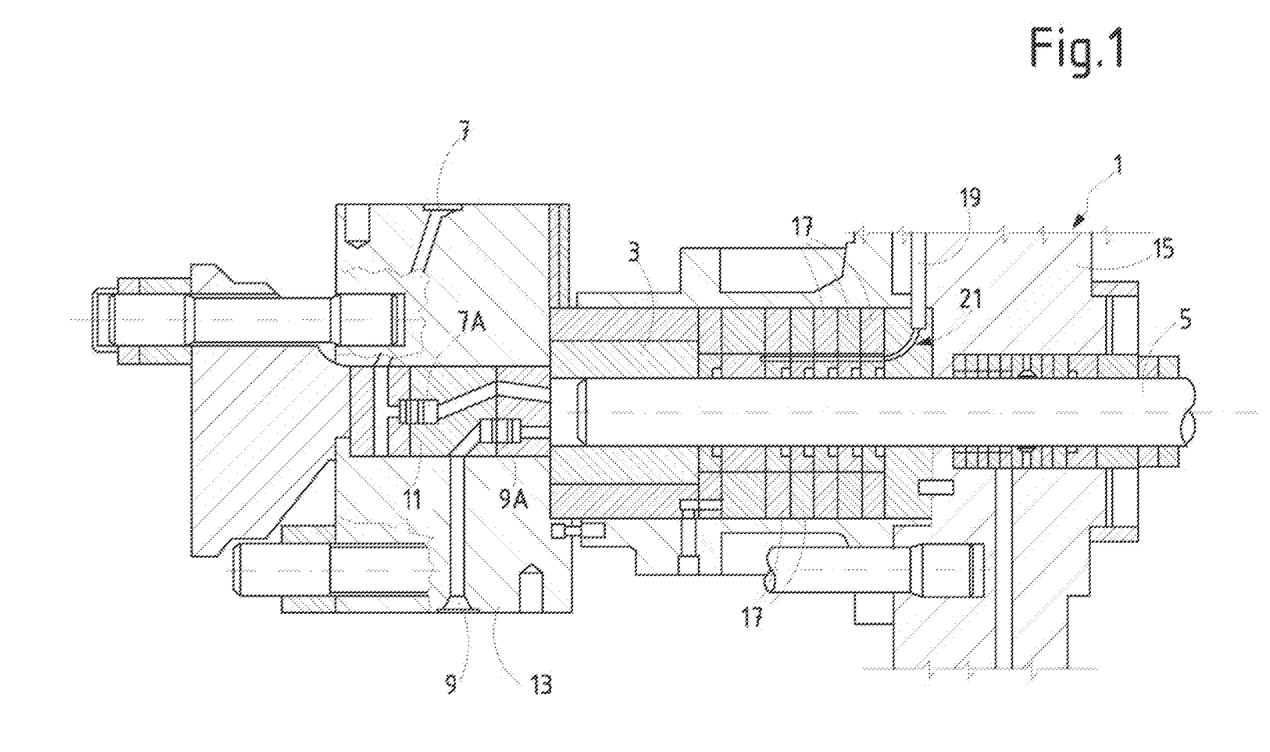
FIG. 1 illustrates a sectional view of a hyper-compressor comprising an arrangement of packing cups surrounding a reciprocating plunger.
Figure 2:
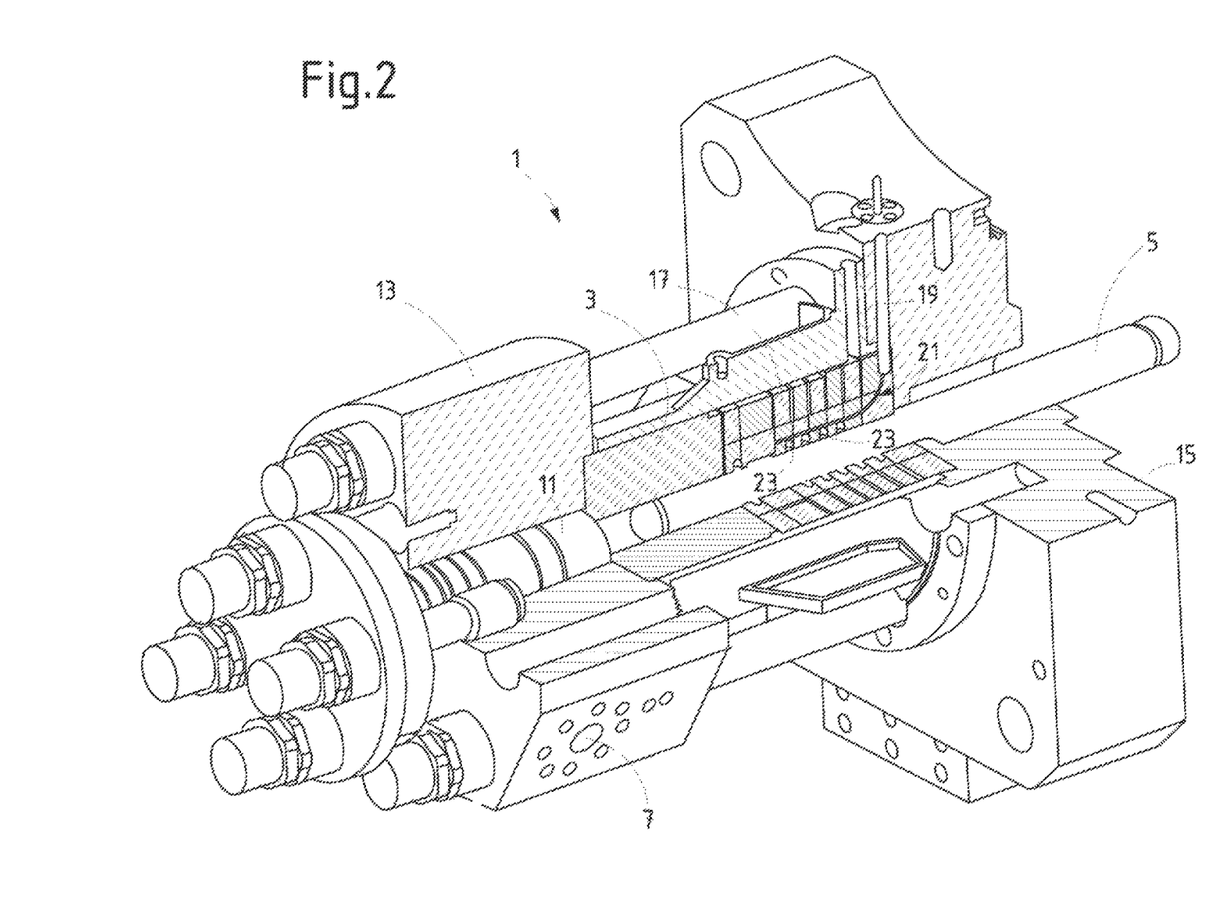
FIG. 2 illustrates a sectional perspective view of the hyper-compressor of FIG. 1.

FIG. 1 illustrates a sectional view and FIG. 2 illustrates a perspective cut-out view of a portion of a hyper-compressor 1. The hyper-compressor comprises a cylinder or packing spacer 3, wherein a plunger or piston rod 5 is arranged. The plunger slides reciprocatingly in the cylinder 3. Reference numbers 7 and 9 indicate the suction port and the discharge port, respectively, of compressor 1. Movement of the plunger 5 in the cylinder 3 sucks fluid through the suction port 7 and discharges fluid at a higher pressure through the discharge port 9. A poppet valve 7A is arranged in the suction port 7 and a poppet valve 9A is arranged in the discharge port 9. The poppet valves 7A, 9A are arranged in a valve body 11 housed in a cylinder head 13. The cylinder 3 is locked between the cylinder head 13 and a flange 15.

Figure 3:
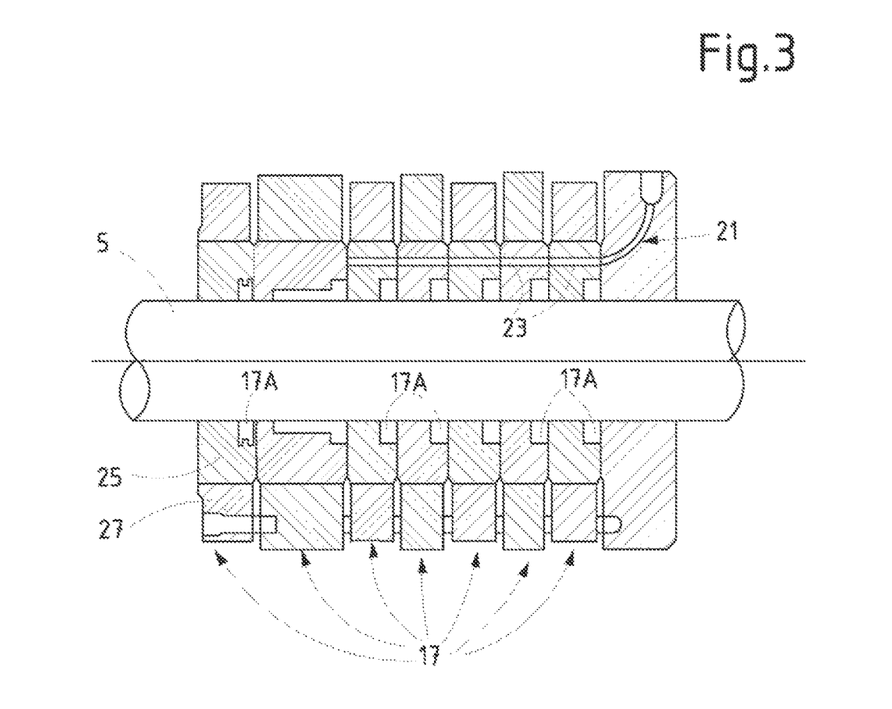
FIG. 3 illustrates an enlargement of the packing cups arrangement of the hyper-compressor in FIG. 1.

Between the cylinder 3 and the flange 15 a stack of packing cups 17 is arranged. An exemplary packing cup 17 is show in FIG. 4 in a perspective view. Each packing cup 17 comprises a central hole 18. In some embodiments the central hole 18 is surrounded by a seat 17A for a gasket (not shown) slidingly sealing against the cylindrical surface of the plunger 5, which reciprocatingly moves through the packing cups 17. Lubrication oil is delivered to the packing cups 17 through lubrication quills 19. One or more lubrication lines 21 are provided, which are formed across the packing cups 17. Each packing cup 17 comprises one or more lubrication-oil ducts 23 extending through the packing cup 17, from a first face to a second face thereof. The lubrication-oil ducts 23 and the packing cups 17 are arranged so that one or more continuous lubrication lines 21 are formed across the entire stack of packing cups 17, as shown in FIG. 3, by aligned lubrication-oil ducts 23 of the packing cups 17.

Figure 4:
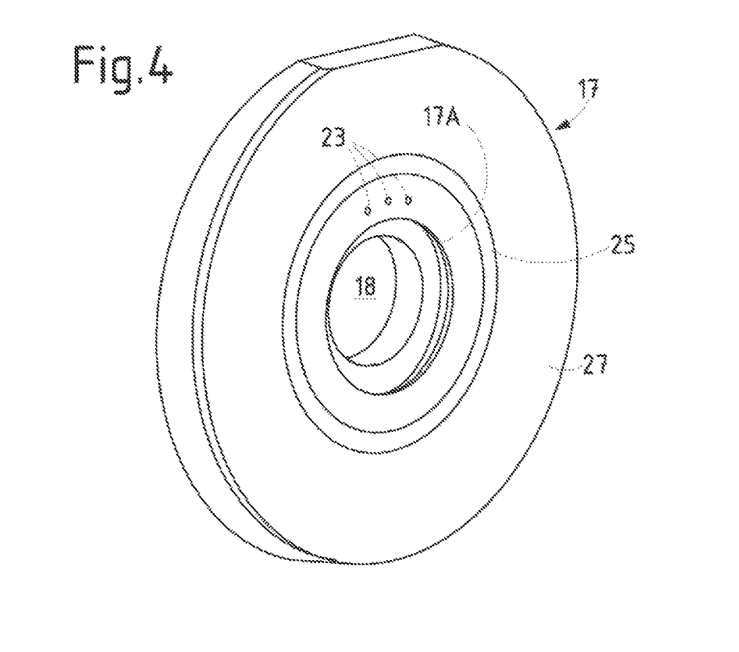
FIG. 4 illustrates a perspective view of a packing cup.

In the exemplary embodiment of FIG. 4 three lubrication-oil ducts 23 are provided in packing cup 17. It shall be understood, however, that a different number of lubrication-oil ducts can be provided. In general, the number of lubrication-oil ducts can differ from one packing cup to the other, to lubricate different sealing rings.

In some embodiments each packing cup 17 comprises two shrink-fitted discs. More specifically, an inner disc 25 is shrink-fitted in an outer disc 27. The central hole 18 and the lubrication-oil ducts 23 are formed in the inner disc 25.

According to the present disclosure, the packing cup 17 is manufactured according to a step sequence as summarized in FIGS. 5, 6A-6C. In a first step, the inner disc 25 with a central hole 18 and lubrication-oil ducts 23 is provided; see FIG. 5, step 101 and FIG. 6A. Reference numbers 25X, 25Y designate respectively a first front planar face and a second front planar face of the inner disc 25. In a subsequent step, the lubrication-oil ducts 23 are subject to autofrettage (FIG. 5, step 102) by introducing therein oil at high pressure. The pressurized oil in the lubrication-oil ducts 23 cause the innermost layer of material surrounding each lubrication-oil duct to plastically yield, while the outermost material is subject to elastic deformation. Once the autofrettage oil pressure is released, the outer elastically-deformed material recovers while the inner plastically yielded material does not recover its original shape. This generates a compressive pre-stress in the material of the inner disc 25 surrounding the lubrication-oil ducts 23.

After autofrettaging of the lubrication-oil ducts 23, the inner disc 25 is machined (FIG. 5, step 103) to remove an outer thickness of the material from the two planar faces 25X, 25Y of the inner disc 25. Starting from an inner disc 25 having a thickness S1 (FIG. 6A), a thinner disc having a thickness S2 is thus obtained (FIG. 6B). Preferably, a layer having a thickness D is removed from both sides of the inner disc 25. The thickness D of each removed layer is between 0 and 50%, e.g. advantageously between 1% and 30%, for example between 5 and 20% or 5 and 30% of the total axial dimension S1 of the inner disc 25. In some embodiments, between 7% and 15% of the total thickness S1 is removed from each face or side of the inner disc 25.

Figure 5:
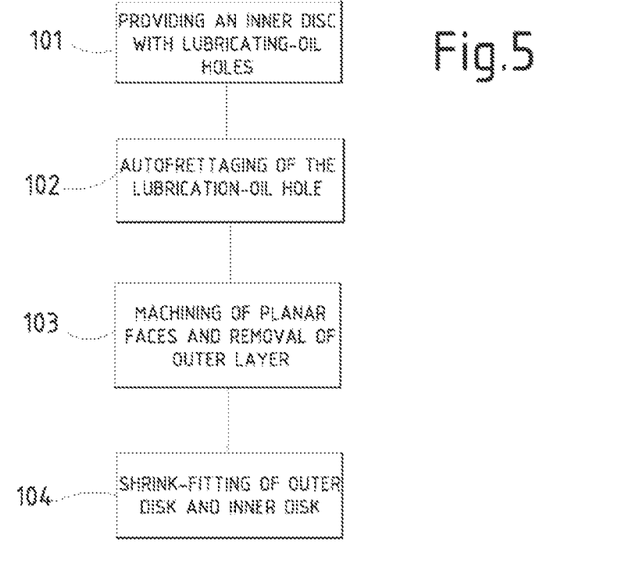
FIG. 5 illustrates a block diagram of a method for manufacturing a packing cup.
Figure 6A:
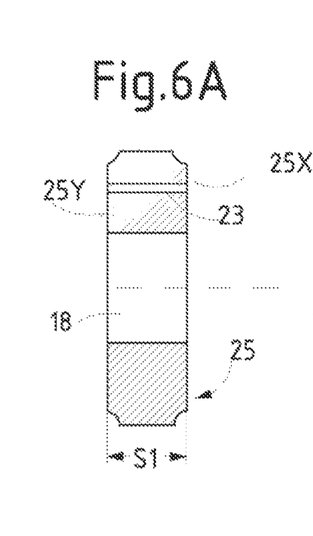
FIGS. 6A-6C schematically illustrate a sequence of manufacturing steps.
Figure 6B:
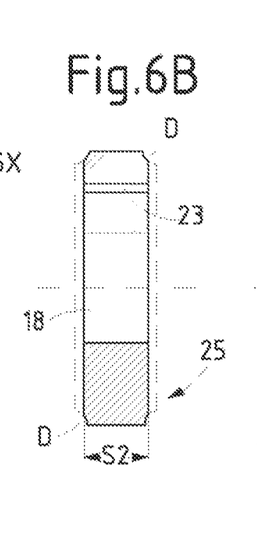
Figure 6C:
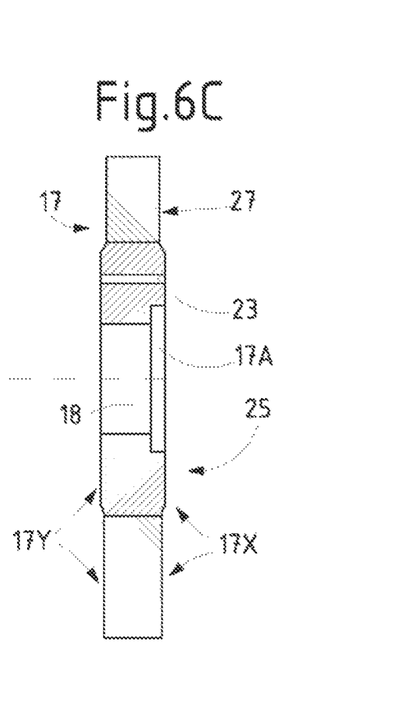

Finally, the inner disc 25 and an outer disc 27 are shrink-fitted according to standard procedure; see FIG. 5, step 104, and FIG. 6C. After shrink-fitting the gasket seat 17A can be machined.

For a better understanding of the advantages achieved with the above-summarized method, the main features of the autofrettage residual stress distribution should firstly be discussed.

Figure 7:
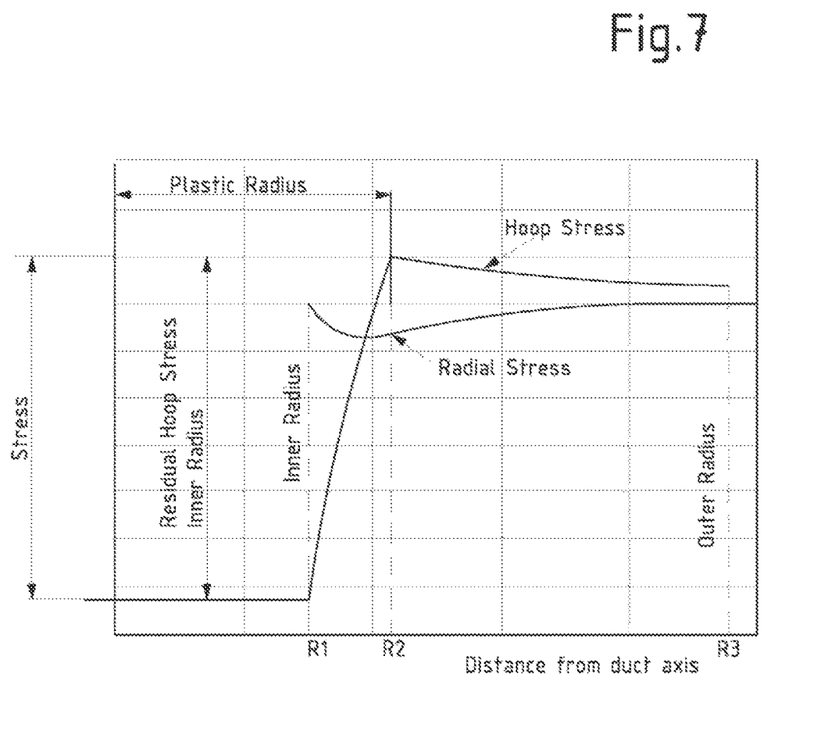
FIG. 7 illustrates diagrams of radial stresses and hoop stresses in a packing cup.
Figure 7A:
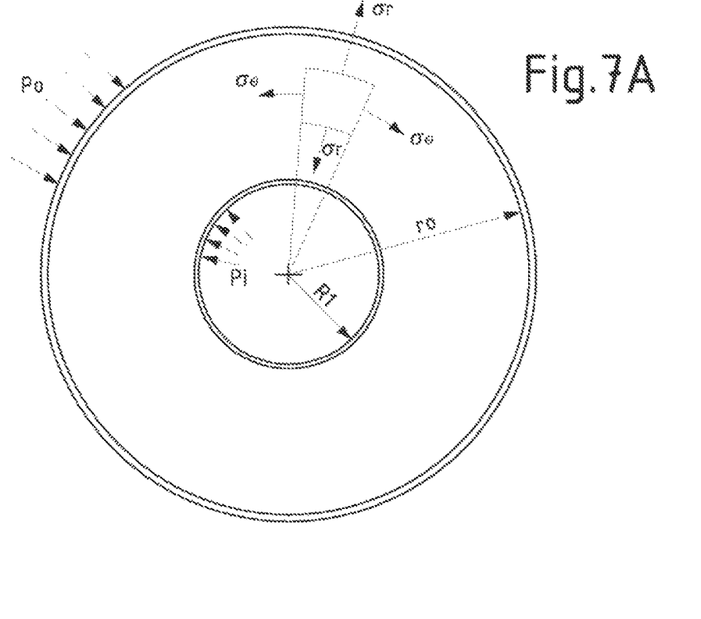
FIG. 7A illustrates the typical stress distribution around the lubrication oil hole.

As noted briefly above, autofrettage is obtained by applying a high pressure, in the range of e.g. 13,000 Bar, in the lubrication-oil ducts 23 provided in the inner disc 25 of a packing cup 17, by means of an autofrettage equipment. The pressure inside the lubrication-oil duct 23 causes a plastic deformation of the innermost layers of the material surrounding the lubrication-oil duct. In a disc of indefinite axial length, i.e. disregarding the boundary effects at the ends of the lubrication-oil duct, autofrettage would generate a residual radial stress and a residual hoop stress in the material surrounding the hole, which varies as a function of the distance from the axis of the lubrication-oil duct as shown in FIG. 7. FIG. 7A provides a pictorial definition of the radial stress ($\sigma_r$) and hoop stress ($\sigma_\theta$) respectively. The radial stress is the stress in the radial direction and the hoop stress is the stress in the tangential direction. Tensile stresses are conventionally indicated as positive (+) values, compressive stresses are conventionally indicated as negative (−) values.

The stress distribution illustrated in FIG. 7 has been obtained by treating the plastically deformed inner layer of the disc material surrounding the lubrication-oil duct applying an elasto-plastic model according to ASME code to evaluate the stress/strain distribution in the yielded material and the correction for Bauschinger effect has been introduced in order to correctly evaluate the maximum residual compressive stress (hence the plastic region dimension) induced by autofrettage.

In FIG. 7 the distance from the axis of the lubrication-oil duct is reported on the horizontal axis and the stress is reported on the vertical axis. R1 indicates the inner radius of the lubrication-oil duct and R2 indicates the so-called plastic radius, i.e. the radius of the plastically deformed material surrounding the lubrication-oil duct. The two curves reported on the diagram of FIG. 7 represent the radial stress and the hoop stress respectively. Due to local plastic deformation in the inner layer surrounding the lubrication-oil duct, a residual hoop stress is obtained at the inner radius R1, i.e. at the surface of the lubrication-oil duct.

The vital characteristics for fatigue life improvement are the residual hoop stresses at inner radius and the plastic radius dimension, hence the depth of the plastically deformed layer.

As a first advantage of the novel manufacturing method described above, it shall be mentioned that since autofrettage is performed prior to shrink-fitting the inner and outer discs together, the entire autofrettaging pressure is useful for the purpose of generating the plastic radius. Different from standard manufacturing processes, where autofrettage is performed on a lubrication-oil duct, which has been already deformed by shrink-fitting, in the method according to the present disclosure, no residual stress induced by shrink-fitting must be overcome. Additionally, the lubrication-oil duct has a substantially circular cross section, rather than an elliptical cross-section as in a packing cup, which has been shrink-fitted prior to autofrettaging. Therefore, the stress distribution after autofrettage is more uniform around the axis of the lubrication-oil duct.

Figure 8A:
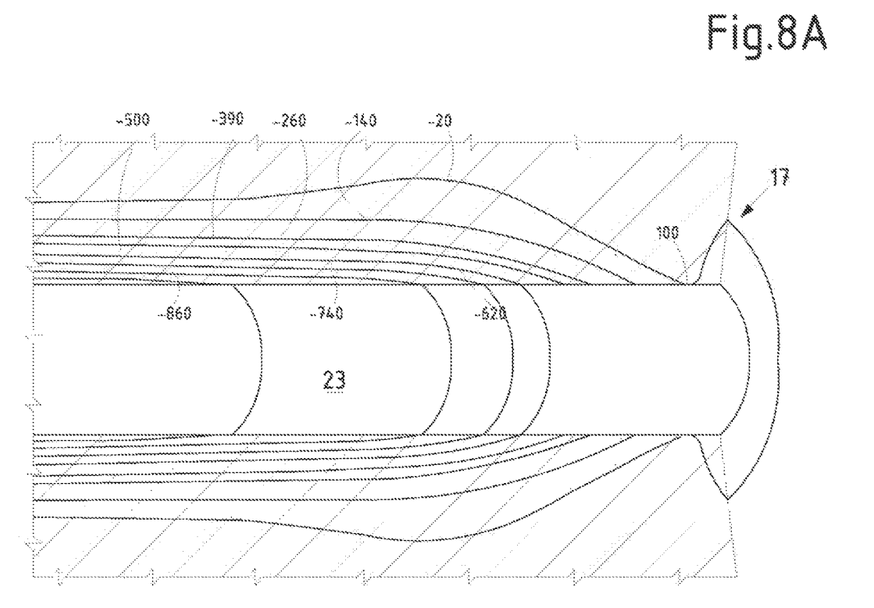
FIGS. 8A, 8B and 8C illustrate the residual hoop stress, residual radial stress and residual von Mises stress in a terminal portion of a lubrication-oil duct of a packing cup manufactured according to the method disclosed herein, after autofrettaging and prior to removing the outer layers of the inner disc.
Figure 8B:
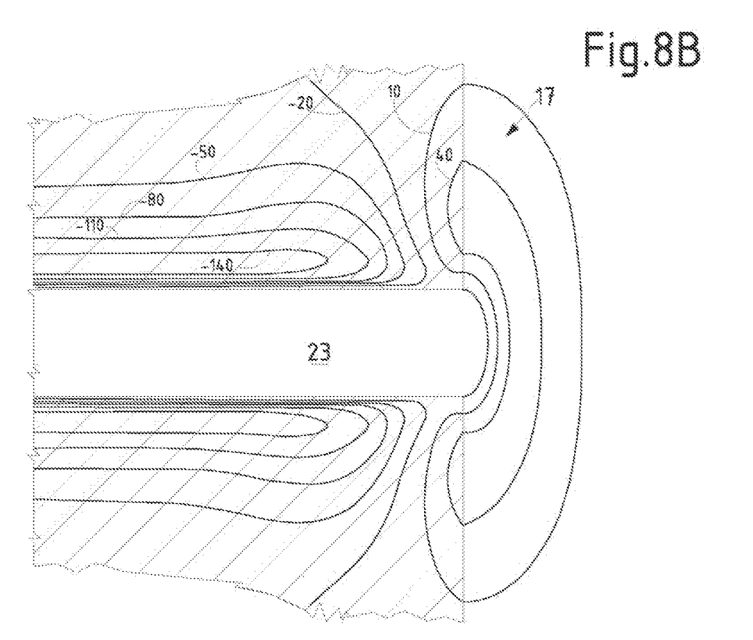
Figure 8C:
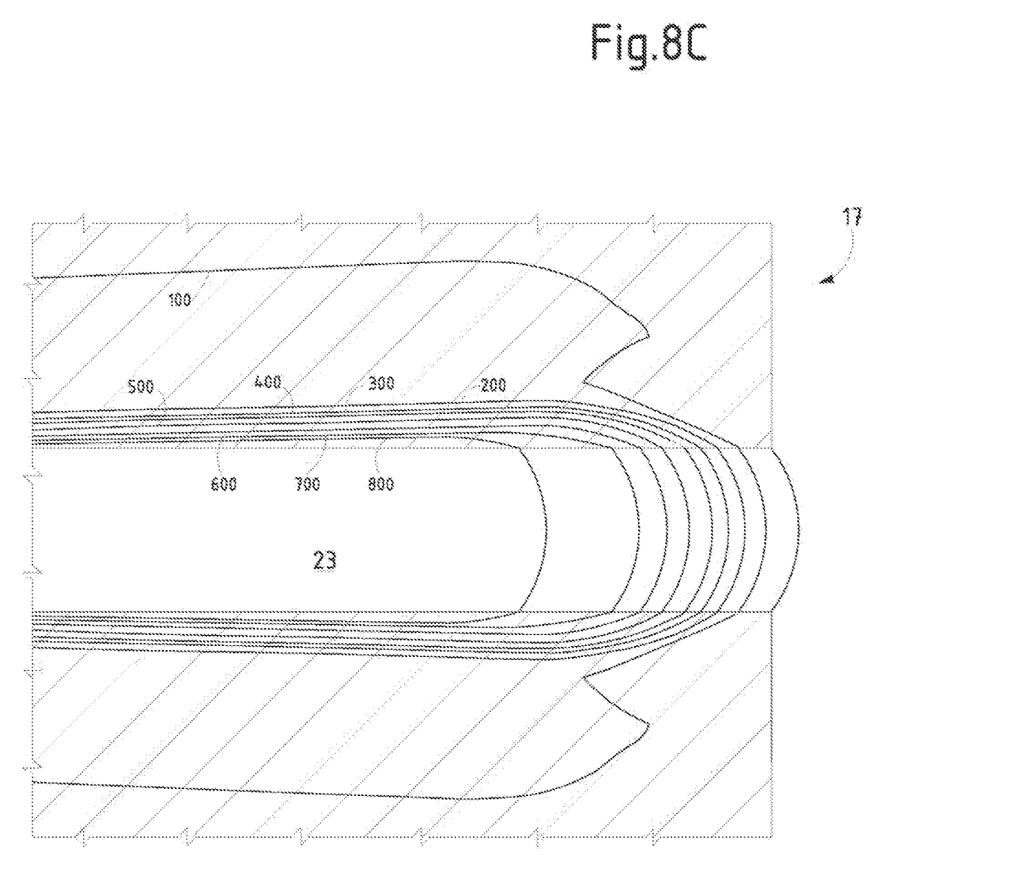

Due to boundary effects, the actual plasticity radius and residual stresses are non-constant along the axial extension of the lubrication-oil duct. More specifically, the residual hoop stress and the residual radial stress decrease towards the ends of the lubrication-oil duct because of the axial stresses. In some circumstances the residual stresses can reverse, i.e. they can become positive, tensile stresses. FIG. 8 illustrates the residual hoop stress (FIG. 8A) and the residual radial stress (FIG. 8B) in the end region of the lubrication-oil duct 23. FIG. 8C illustrates the so-called "von Mises stress" (also known as "equivalent stress") in the terminal portion of the lubrication-oil duct.

In the figures the residual stress distribution is represented by constant-stress curves, each curve representing the location where the respective (hoop or radial) stress has a constant value, the value being reported on each curve and is expressed in MPa.

As can be appreciated from these figures, both the residual radial stresses as well as the residual hoop stresses become positive (tensile stress) in the boundary area at the end of the lubrication-oil duct. In the adjacent areas located near the boundary area, the residual hoop stress is not reversed (i.e. remains negative). However in said adjacent areas the residual hoop stress has a much lower modulus than in the central area of the lubrication-oil duct and is, therefore, insufficient for the purposes of preventing fatigue-promoted crack propagation. Absent any subsequent machining step, during operation the tensile stresses induced in the material by the pressure fluctuations inside the lubrication-oil duct become greater than the residual compressive pre-stress. Any flaw present in the material would then be expanded and pressurized oil would penetrate therein. The cyclic fluctuation of the lubrication-oil pressure would lead to crack formation and propagation and eventually to failure of the packing cup.

Figure 9A:
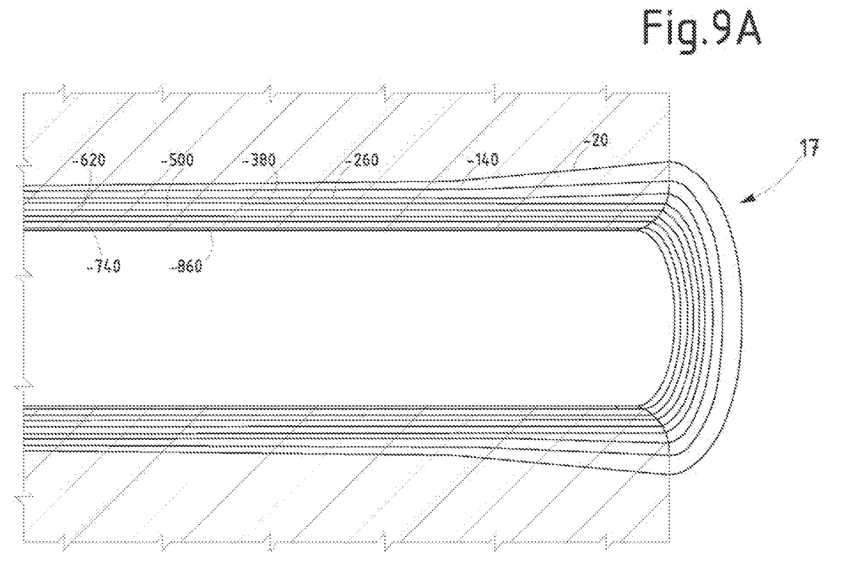
FIGS. 9A, 9B and 9C illustrate the residual hoop stress, residual radial stress and residual von Mises stress in a terminal portion of a lubrication-oil duct of a packing cup manufactured according to the method disclosed herein, after autofrettaging and removal of the outer layers of the inner disc.
Figure 9B:
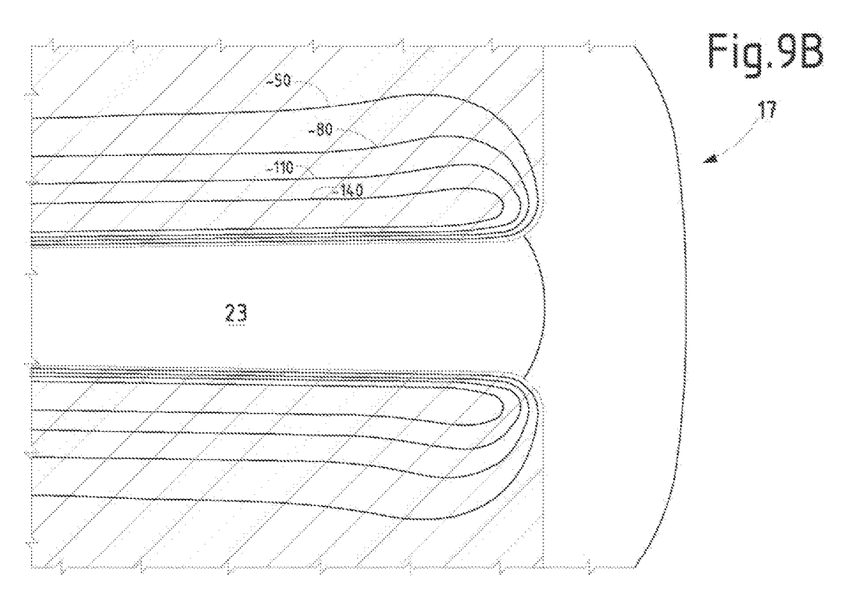
Figure 9C:
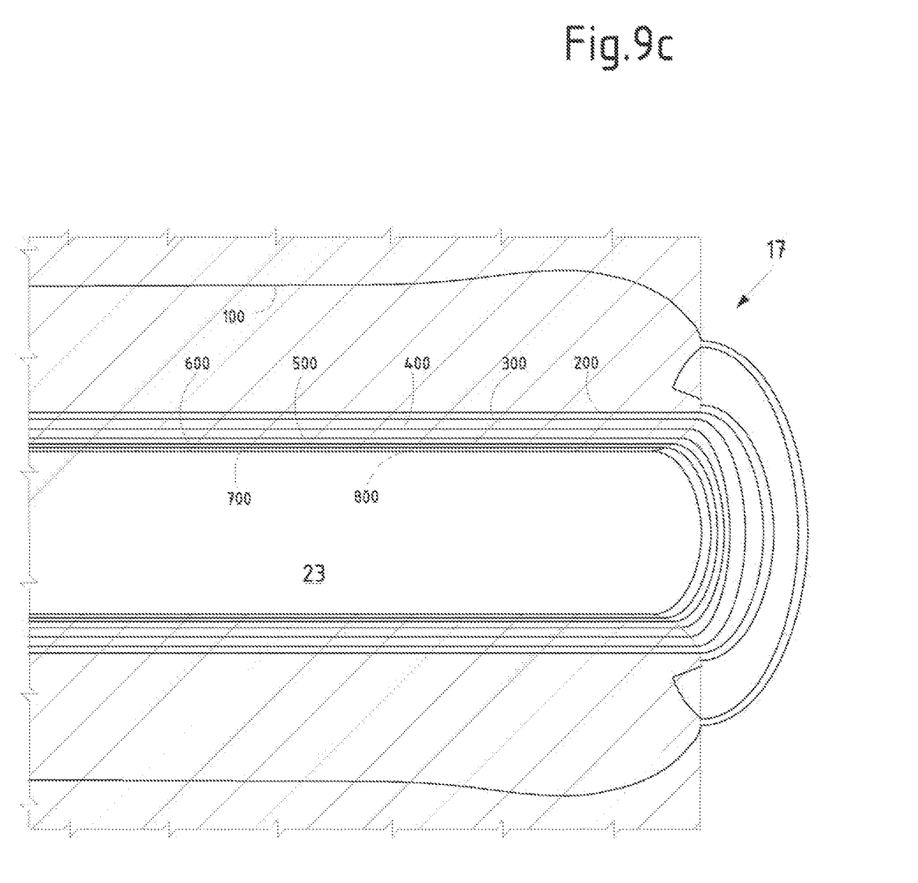

The aim of the machining step is to remove these areas, where the boundary effects reduce or reverse the residual stress in the material surrounding the lubrication-oil duct. FIGS. 9A, 9B and 9C are similar to FIGS. 8A-8C, and illustrate the same terminal area of the lubrication-oil duct, after removing the outermost layer of the inner disc 25. Curves of equal residual stresses are represented, with the value of the residual stress expressed in MPa being reported on each curve. As can be appreciated from these figures, the residual compressive hoop and radial stresses, as well as the von Mises stresses in the portion of material forming the disc after machining are substantially higher than those in the removed layers.

Figure 10A:
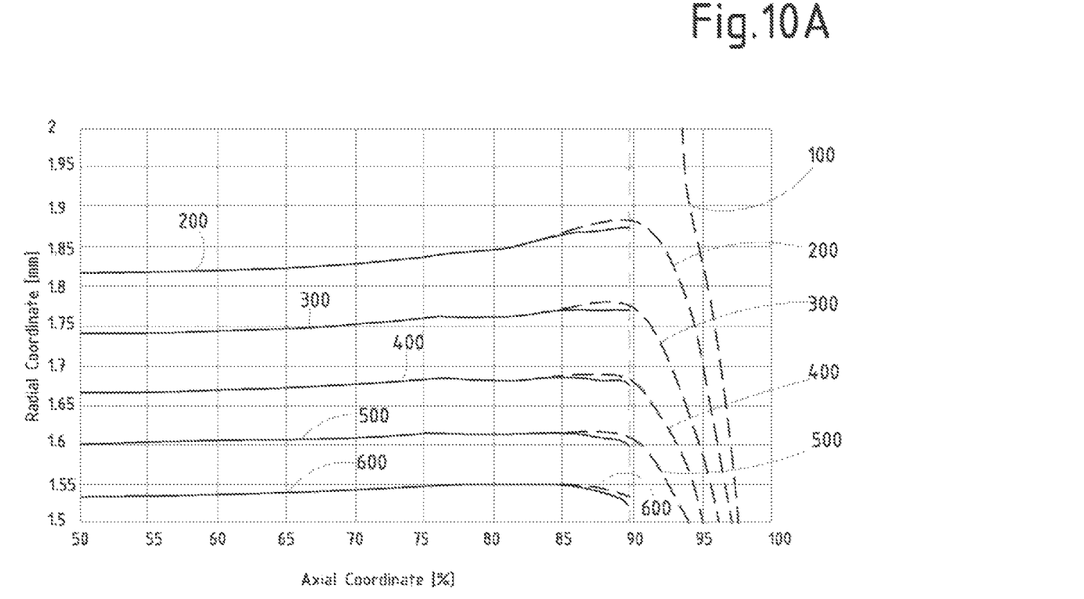
FIGS. 10A, 10B illustrate diagrams showing curves of residual equivalent stress, respectively before and after removal of the outer layer of the inner disc.
Figure 10B:
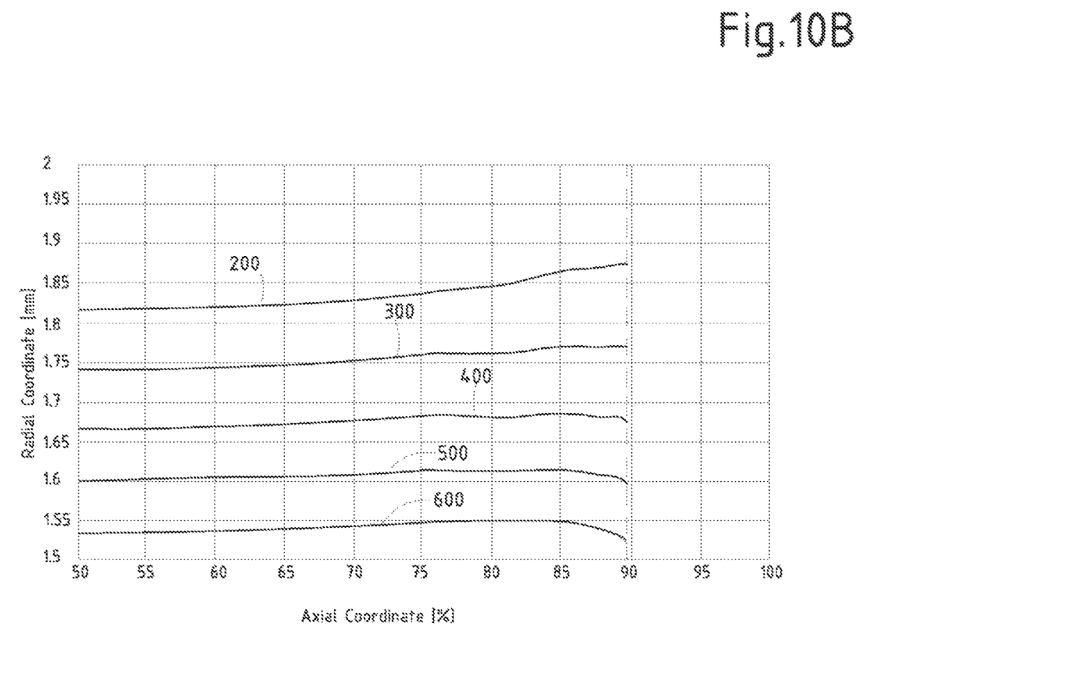

FIGS. 10A and 10B illustrate the residual von Mises stresses, i.e. the residual equivalent stresses in the area surrounding one end of a lubrication-oil duct after autofrettage and before removal of the outer layer of material forming the inner disc (FIG. 10A) as well as after removal of the outer layer (FIG. 10B). At the opposite end of the lubrication-oil duct a similar situation is present. The values reported on the individual curves indicate the equivalent residual stress measured in MPa. On the horizontal axis the axial coordinate along the lubrication-oil duct is reported, starting from the central point of the duct. The axial coordinate is normalized with respect to the total length of the duct (% length). The radial coordinate, i.e. the distance from the axis of the lubrication-oil duct, is reported on the vertical axis.

Figure 11A:
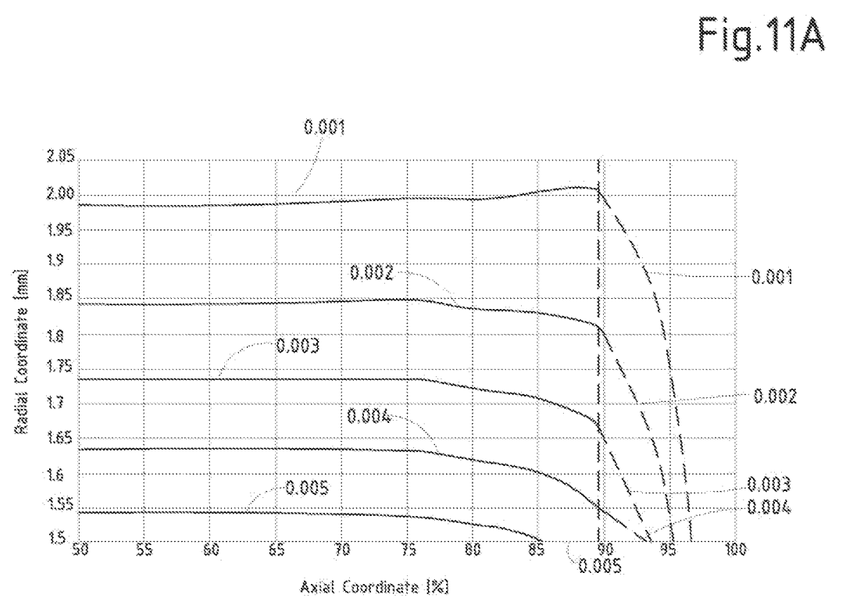
FIGS. 11A, 11B illustrate diagrams of the residual equivalent plastic strain, respectively before and after removal of the outer layer of the inner disc.
Figure 11B:
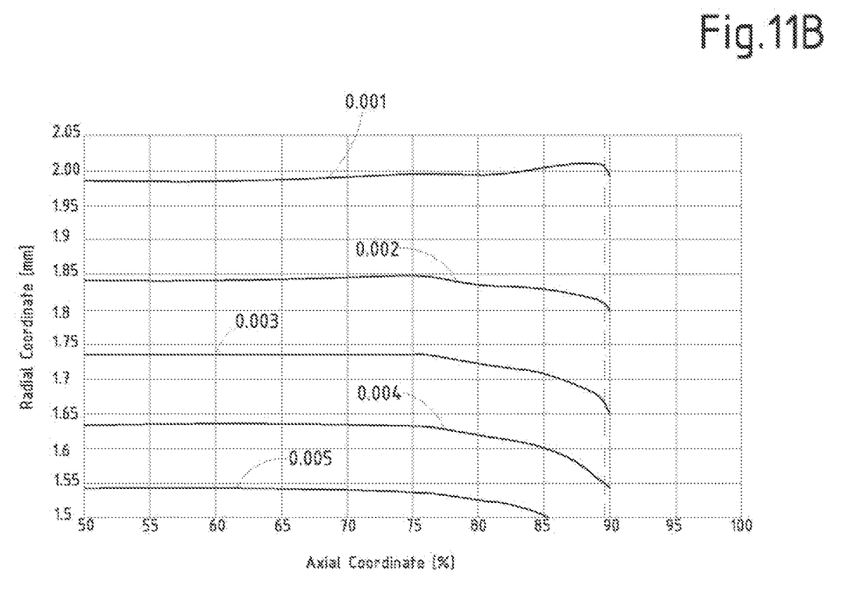

FIGS. 11A and 11B illustrate the residual equivalent plastic strain after autofrettage, respectively before (FIG. 11A) and after (FIG. 11B) removal of the outer material layer from the inner disc 25. The vertical and horizontal axes report the radial and axial coordinates, respectively. The values on each curve are expressed in fractional strain (mm/mm).

Figure 12A:
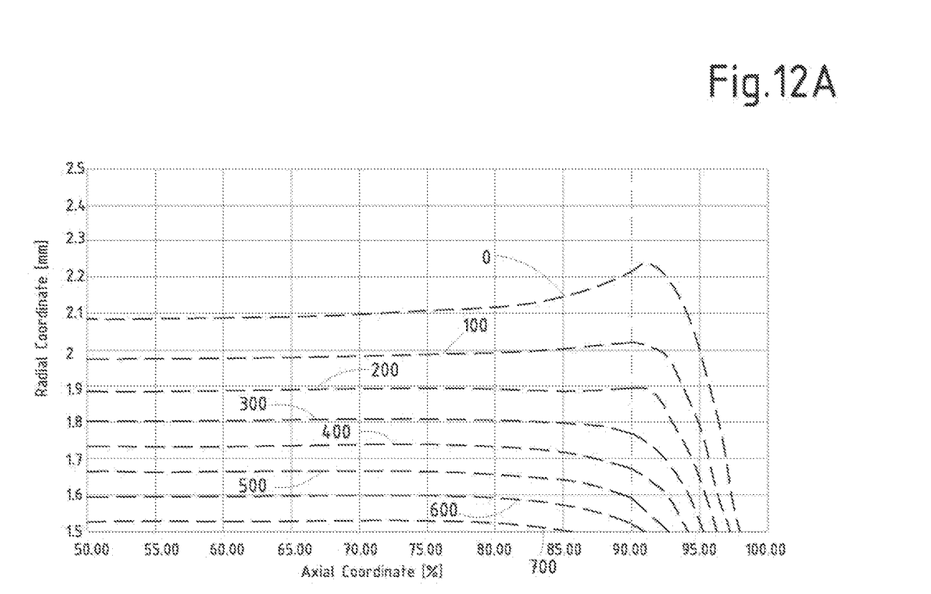
FIGS. 12A, 12B illustrate diagrams showing curves of residual hoop stress, respectively before and after removal of the outer layer of the inner disc.
Figure 12B:
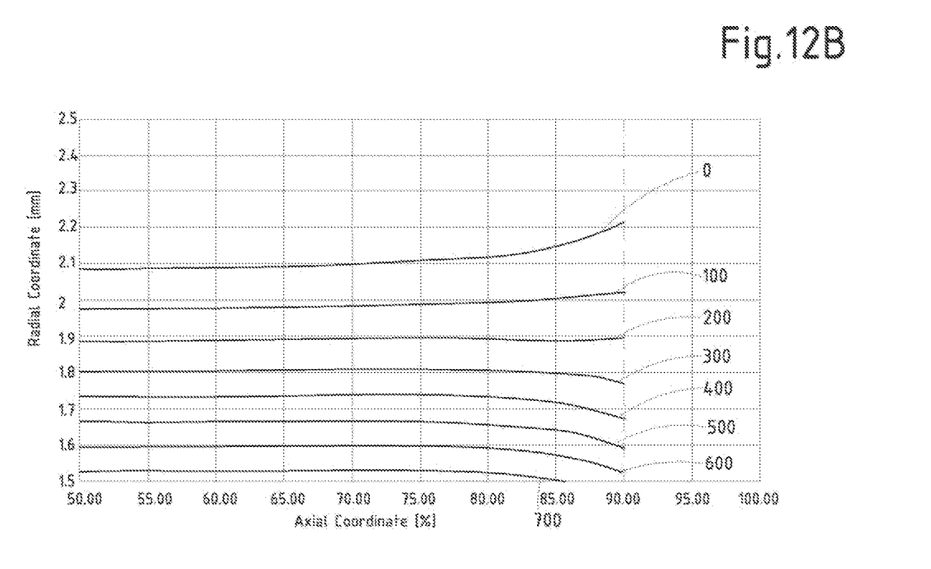

FIGS. 12A and 12B illustrate, in a manner similar to FIGS. 10A and 10B, the residual hoop stresses after autofrettage of the lubrication-oil duct. More specifically, FIG. 12A illustrates the residual hoop stresses before machining of the disc for removing the outer layers. FIG. 12B illustrates the residual hoop stresses after machining. The curves in both figures are curves of constant stress values, i.e. curves along which the residual hoop stress remains constant. The stress value is reported on each curve and is expressed in MPa. The horizontal axis represents the axial coordinate (in %, expressed in mm/mm, starting from the center of the lubrication-oil duct), i.e. the distance, in axial direction, from the duct center. The vertical axis represents the radial coordinate (in mm), i.e. the distance from the axis of the lubrication-oil duct in the radial direction.

Figure 13A:
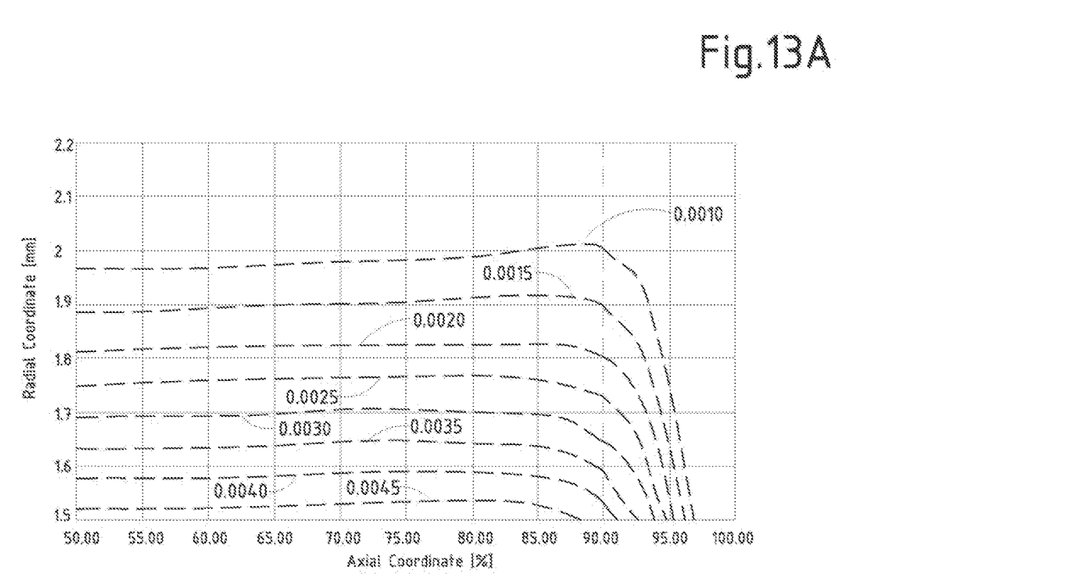
FIGS. 13A, 13B illustrate diagrams showing curves of residual hoop strain, respectively before and after removal of the outer layer of the inner disc.
Figure 13B:
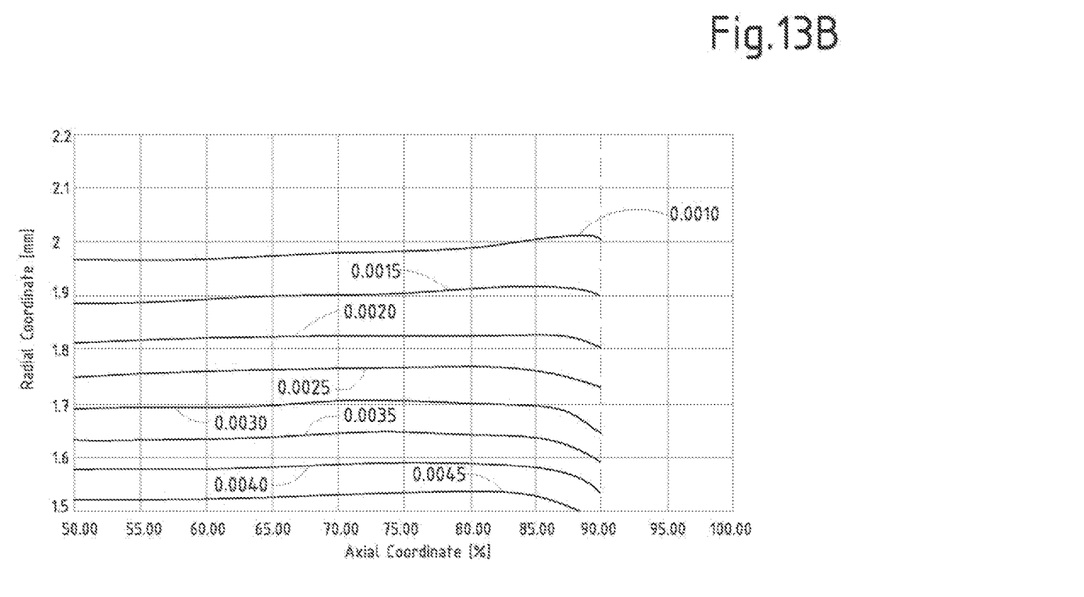

FIGS. 13A and 13B show the residual hoop strains after autofrettage, respectively before (FIG. 13A) and after (FIG. 13B) machining and removal of the outer layers of the disc. The vertical and horizontal axes show the same parameters as in FIGS. 12A, 12B. On each curve the residual stress (expressed in MPa) and the residual strain (expressed in mm) is reported.

As can be appreciated from FIGS. 8 to 13, machining removes the most critical boundary area at each end of the lubrication-oil duct, where an insufficient residual stress is present. The remaining part of the lubrication-oil duct is therefore capable of better resisting fatigue stress and is less prone to crack formation and propagation.

As can be appreciated from the diagrams in FIGS. 8 to 13, after removal of the end volume surrounding the lubrication-oil duct, the residual equivalent stress value remains substantially constant at each radial distance along the axial extension of the lubrication-oil duct. This is particularly clear from the curves in FIG. 10. Each curve represents a value of the residual equivalent stress, i.e. von Mises stress. Each curve is substantially parallel to the abscissa, i.e. to the axis of the lubrication-oil duct. More specifically, especially in the volume nearer to the lubrication-oil duct the residual equivalent stress varies less than 25% along the a direction parallel to the axis of the lubrication-oil duct.

For example, moving along the 1.6 mm ordinate, the residual equivalent von Mises stress after autofrettage fluctuates around 500 MPa. Before machining of the disc and removal of the outermost layer thereof, the von Mises stress along the 1.6 mm ordinate decreases from 500 MPa in the center of the axial extension of the lubrication-oil duct (abscissa=50) to 0÷100 MPa on the outer layers to be removed. The innermost volume surrounding the lubrication-oil duct shows an even more constant value of the residual stress, with fluctuations equal to or less than 15% or even equal to or less than 10%.

According to some embodiments, as can be observed in FIGS. 10A, 10B, after autofrettage and removal of the outer material layer, at a given radial distance from the lubrication-oil duct, the variation of the residual equivalent stresses along the axial coordinate is substantially smaller than in prior art packing cups. In particular, moving along the axial coordinate the residual equivalent (von Mises) stress varies less than 15% and preferably less than 10% in the first 10% of the axial length, starting from the disc surface.

It shall be noted that the stress and strain data reported in the above discussed diagrams are determined before shrink-fitting of the outer and inner discs 25, 27. However, even though shrink fitting will modify the residual stress and strain distribution, mainly in the circumferential direction around the lubrication-oil duct (due to oval deformation thereof) the percentage variation of these values along the axial extension of the duct is substantially unaffected by shrink-fitting. In other words, the modification on the axial distribution of the residual stresses and strains is negligible, as far as the effect on the improved fatigue resistance is concerned.

Moreover, according to some embodiments, as can be observed in FIGS. 12A, 12B, the residual hoop stresses along the inner surface of the lubrication-oil duct after autofrettage and removal of the outer material layer will remain always negative, i.e. the residual hoop stresses will always be compressive stresses. Additionally, the residual hoop stress along the entire surface of the lubrication-oil duct will always be at least 20% of the maximum residual loop stress, at the center of the lubrication-oil duct. Subsequent shrink fitting of the two discs 25, 27 does not significantly affect this situation.

Residual stresses and strains in the material surrounding the lubrication-oil duct can be measured by neutron scattering technique. Therefore, the method performed for manufacturing a packing cup can be determined from residual strains and stresses measured on the machined packing cup even after shrink-fitting.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions.

The invention claimed is:

1. A method of manufacturing a packing cup for a hyper-compressor, the method comprising the following steps:
   providing an inner disc, having opposed first front face and second front face, a central axial hole, and at least one lubrication-oil duct; said axial hole and said at least one lubrication-oil duct extending from said first front face to said second front face;
   autofrettaging said at least one lubrication-oil duct;
   after autofrettaging, removing a thickness of said inner disc on both said first front face and said second front face; and
   after removing the thickness of said inner disc on both said first front face and said second front face, shrink-fitting said inner disc and an outer disc.

2. The method of claim 1, wherein a volume of material surrounding said at least one lubrication-oil duct of the manufactured packing cup has a residual equivalent stress which is substantially constant along a direction parallel to an axis of said lubrication-oil duct, starting from said first front face or said second front face along at least a portion of an axial extension of said lubrication-oil duct.

3. The method of claim 2, wherein said residual equivalent stress fluctuates by 25% or less along a first 10% of said axial extension of said at least one lubrication-oil duct, starting from said first front face and from said second front face.

4. The method of claim 3, wherein said residual equivalent stress fluctuates by 20% or less along the first 10% of said axial extension of said at least one lubrication-oil duct, starting from said first front face and from said second front face.

5. The method of claim 4, wherein said residual equivalent stress fluctuates by no more than 15% along the first 10% of said axial extension of said at least one lubrication-oil duct, starting from said first front face and from said second front face.

6. The method of claim 5, wherein said residual equivalent stress fluctuates by no more than 10% along the first 10% of said axial extension of said at least one lubrication-oil duct, starting from said first front face and from said second front face.

7. The method of claim 1, wherein between 5% and 30% of an overall axial dimension of said inner disc is removed on each said first front face and said second front face.

8. The method of claim 7, wherein between 7% and 15% of the overall axial dimension of said inner disc is removed on each said first front face and said second front face.

9. The method of claim 1, wherein between 1% and 30% of an overall axial dimension of said inner disc is removed on each said first front face and said second front face.

10. The method of claim 1, wherein a volume of material surrounding said at least one lubrication-oil duct of the manufactured packing cup has a residual compressive hoop stress along an entire axial extension of said lubrication-oil duct; and wherein said residual hoop stress has a first value at a central location, intermediate between said first front face and said second front face.

* * * * *